United States Patent Office 3,642,954
Patented Feb. 15, 1972

3,642,954
BLEND OF BUTADIENE/ACRYLONITRILE COPOLYMER, STYRENE POLYMER AND CHLORINE-CONTAINING POLYMER AS A VIBRATION DAMPING COMPOSITION
Alan Edgar Turner, Runcorn, England, assignor to Imperial Chemical Industries Limited, London, England
No Drawing. Filed Feb. 7, 1969, Ser. No. 797,672
Claims priority, application Great Britain, Feb. 26, 1968, 9,206/68
Int. Cl. C08d 9/08
U.S. Cl. 260—889                    9 Claims

ABSTRACT OF THE DISCLOSURE

Wide temperature band vibration damping compositions, particularly suitable for use as interlayers between resonating sheets in laminates, comprise in combination a butadiene/acrylonitrile copolymer, a polymer of styrene with 0 to 50% of butadiene, a chlorine-containing polymer selected from chlorinated ethylene polymers and copolymer of vinylidene chloride with alkyl esters or nitriles of acrylic or methacrylic acids, and optionally a filler to improve modulus. The laminates are particularly suitable for conversion to housings such as valve gear covers, timing gear covers and sumps for internal combustion engines.

---

This invention relates to materials suitable for damping the vibrations of resonant sheets e.g. of metal, and to composite structures containing them. In particular, it relates to vibration damping materials having useful damping properties over a broad temperature band, e.g. from ambient or even sub-ambient temperatures to elevated temperatures e.g. in the region of 80° C. or even higher for example up to 100° C., and which are of particular use as interlayers in laminates.

It is already known that the resonant vibrations of e.g. metal sheets may be reduced by coating them with certain synthetic polymers or by substituting for them laminates comprising a stack of two or more e.g. metal sheets with an interlayer of polymer between each adjacent pair of said sheets. It is also known that the temperature range over which the laminates have useful vibration damping properties may be enlarged to some extent by copolymerization. The resistance to resonant vibration of a laminate structure such as described depends upon (a) the nature of the material e.g. metal employed in the sheets and (b) the relative thickness of the sheets and the polymer interlayers but in general it is desired to achieve an extent of vibration damping corresponding to a loss factor for the laminate of at least 0.05 at a frequency of 100 Hz. or higher. This represents a marked improvement over a loss factor of about 0.01, or usually much less, which is the case for metal sheets vibrating in air which have not been treated with a vibration damping material. Even in the case of the preferred copolymers described hitherto, the temperature range over which loss factors of this order have been achieved at 100 Hz. for laminates of the kind described is generally less than 100° C. and is very much less, e.g. of the order of only 50° C. at, say, 1000 Hz., even when using polymeric interlayers as much as 0.3 mm. (0.012 inch) thick between 0.5 mm. (0.020 inch) steel sheets.

We have now found a composition which has useful damping properties over a broad temperature band extending from ambient or even sub-ambient temperatures to temperatures of 80° C. to 100° C. or even above, and which in particular when used in the form of an interlayer between sheets of resonating material, e.g. metal, provides laminates having very desirable vibration damping properties over a broad temperature range. For example, an interlayer of our composition between steel sheets 0.5 mm. (0.020 inch) thick, gives a laminate whose loss factor exceeds 0.05 over a temperature range in excess of 100° C. at 100 Hz., even when used in thicknesses of only 0.15 mm. (0.006 inch).

According to the present invention, we provide a vibration damping composition comprising (i) a butadiene/acrylonitrile copolymer, (ii) polystyrene or a copolymer thereof with up to 50% by weight of butadiene, and (iii) a chlorine-containing polymer selected from (a) chlorinated polymers of ethylene and (b) copolymers of from 10 to 90% by weight of vinylidene chloride and from 90 to 10% by weight of at least one alkyl ester or nitrile of acrylic or methacrylic acid.

By suitable choice of the nature and concentration of each polymeric ingredient in the composition, vibration damping materials may be obtained which exhibit useful damping properties in the frequency ranges commonly associated with for example internal combustion engines over most normal operating conditions of temperature, e.g. from −10° C. to +100° C., and which may be sandwiched between metal plates to provide laminates eminently suitable for pressing into housings, such as sumps, timing gear covers and valve gear covers, associated with internal combustion engines.

Thus, for example, variation of the acrylonitrile content of the butadiene/acrylonitrile copolymer provides a means of controlling to some extent the minimum effective temperature of the composition; lower minimum effective temperatures requiring lower concentrations of acrylonitrile. On the other hand, reducing the acrylonitrile content also tends to reduce the damping efficiency of the composition and therefore it is seldom desirable to use copolymers containing less than about 20% acrylonitrile by weight. Increasing the acrylonitrile content provides a corresponding increase in the damping efficiency of the composition but its minimum effective temperature tends to be raised. Consequently, it is not usually desirable to increase the acrylonitrile content above about 40% by weight.

Increasing the concentration of the butadiene/acrylonitrile copolymer in the composition tends to increase the overall effectiveness of the material at lower temperatures but an undesirable reduction in its effectiveness at high temperatures may be induced if concentrations above about 60% by weight are used. For most purposes, suitable concentrations of this copolymer in the composition lie in the range 10 to 60%, and preferably 30 to 50%, by weight.

The properties of the composition in the medium and upper temperature range may be controlled primarily by varying the nature and concentrations of the styrene polymer or copolymer and the chlorine containing polymer. The styrene polymer or copolymer suitably forms from 10 to 50%, and preferably 15 to 25%, by weight of the composition. Styrene contents in the polymer of from 50% to 100% are satisfactory but copolymers containing 65% to 90% by weight of styrene are preferred.

The chlorine-containing polymer suitably forms from 30 to 80% by weight of the composition but is preferably present in an amount of from 35% to 60% by weight. Where it is a chlorinated ethylene polymer, e.g. chlorinated polyethylene, it preferably contains 15 to 50% by weight of chlorine. Where it is a vinylidene chloride copolymer, this preferably contains 30 to 90% by weight of vinylidene chloride. The comonomer with the vinylidene chloride may be an alkyl ester or nitrile of acrylic acid or methacrylic acid. Acrylonitrile and ethyl acrylate are preferred but other examples are butyl acrylate, 2-ethyl hexyl acrylate, butyl methacrylate, 2-ethyl hexyl methacrylate and methacrylonitrile.

The composition may also contain other components, if desired, including other polymers. In particular, we have found that up to 20% by weight of the styrene polymer or copolymer may be replaced by crosslinked butadiene/styrene elastomer.

The addition of finely divided fillers is useful for increasing the modulus of the composition, if that is found desirable. Examples of suitable fillers are carbon black, graphite, mica, vermiculite and calcium carbonate, and these may be used in combination, if desired. The amount used will depend upon the intended purpose of the composition. For example, where the composition is intended to form an interlayer between two resonant sheets, the amount of filler preferably does not exceed 5% by weight of the composition. However, where the composition is applied as an external coating to a resonant sheet, concentrations up to 60% by weight of the composition may be found desirable.

Our compositions may be prepared by mixing the individual components while keeping the polymeric materials in a softened state, e.g. using a two-roll mill or Banbury mixer. It does not appear essential to ensure complete and intimate mixing but it is generally desirable at least to achieve a blend which to the naked eye appears homogeneous. Alternative methods of preparation include dissolving or dispersing the ingredients in suitable liquid media, mixing the media and recovering the composition from the resultant mixture.

As stated hereinbefore, the compositions of our invention are particularly suitable for use in the formation of laminates, or sandwich structures, wherein they may be provided in the form of interlayers, e.g. in sheet or foil form, between pairs of adjacent sheets at least one of which will be of metal or other resonating material. To form these laminates, or sandwich structures, the compositions may be applied to the sheets from solution or dispersion, e.g. by spraying. Alternatively, the composition may be converted to a sheet or foil which is applied, for example, by pressing.

In addition to their highly desirable vibration damping properties, or compositions also exhibit adhesive properties. Consequently, it is not usually necessary to treat the metal sheets other than, for example, by degreasing. Nor is it necessary to use additional adhesives before applying or compositions, although this may be done in cases where strong adhesion is considered desirable.

The laminates so formed, in which each interlayer of the vibration damping material is preferably from 0.05 to 1.25 mm. (0.002 to 0.05 inch) thick and the sheets are of metal, are preferably from 1 to 6 mm. (0.040 to 0.25 inch) overall thickness. They are especially suitable for shaping into housings for machinery, e.g. housings for attaching to the heavy cast and/or machined parts, e.g. cylinder blocks and cylinder heads, of internal combustion engines, e.g. for use in road vehicles. In particular, they may be used in the formation of timing gear covers, sumps, valve gear (tappet) covers and the like, or parts thereof.

The invention is illustrated by the following examples in which all parts are expressed as parts by weight.

EXAMPLE 1

A composition comprising 40 parts of a butadiene/acrylonitrile copolymer containing 34% by weight of acrylonitrile, 20 parts of a butadiene/styrene copolymer containing 85% by weight of styrene and 40 parts of chlorinated polyethylene containing 27% by weight of chlorine were formed into a foil by mixing on a heated two-roll mill and subsequently passing through the rolls of a heated calender.

The loss factor of samples of the sheet was measured by the vibrating reed method described in pages 2 to 6 of the Journal of Scientific Instruments, volume 32, 1955, and was found to be at least 0.1 over the entire temperature range of from $-10°$ C. to $+100°$ C., at a shear modulus of about $10^7$ to $10^{10}$ dynes/sq. cm.

Laminates were prepared from two sheets each 0.5 mm. (0.020 inch) thick of deep-drawing quality mild steel and an interlayer from the above described composition by pressing a foil of the composition between the two steel sheets at 130° C. and about 10 lbs./ sq. in.

Interlayer 0.15 mm. (0.006 inch), 0.30 mm. (0.012 inch) and 0.45 mm. (0.018 inch) thick were used in different experiments. The loss factors of the laminates were measured using the method described below.

A beam of the laminate, about 3 to 6 inches (76 to 152 mm.) in length, was clamped at or near one end to the drive rod of a 50 lb. shaker which was then set into vibration at the fundamental resonant frequency of the beam. The amplitude of vibration was measured using a ceramic strain gauge cemented to the beam. Frequencies to give $1\sqrt{2}$ of maximum amplitude were determined by a method similar to that described in the article on pages 2 to 6 of the Journal of Scientific Instruments, volume 32, 1955.

Loss factors for the laminates were calculated using the formula $$\eta = \frac{f_1 - f_2}{f_0}$$

where $\eta$ is the loss factor, $f_0$ is the resonant frequency and $f_1$ and $f_2$ are the frequencies giving $1\sqrt{2}$ of maximum amplitude.

The resonant frequencies of the laminates tested lay in the range 100 to 300 Hz.

For the laminate containing the thinnest interlayer, the loss factor of the composite exceeded 0.06 over the temperature range from $-2°$ C. to well in excess of 100° C. For the laminate containing the 0.30 mm. thick interlayer, the loss factor exceeded 0.08 from below $-10°$ C. to substantially above 100° C. and for the laminate containing the thickest interlayer, the loss factor of the composite was greater than 0.1 from $-5°$ C. to substantially above 100° C.

Valve gear covers and timing gear covers for internal combustion engines were pressed from the laminates by deep drawing.

EXAMPLE 2

The composition of Example 1 was modified by replacing the styrene/butadiene copolymer by an equal weight of polystyrene and a laminate was formed from a layer of the composition, 0.20 mm. (0.008 inch) thick between sheets of deep-drawing quality mild steel 0.46 mm. (0.018 inch) thick.

The loss factor of samples of the laminate was measured by the method described in Example 1 and was found to exceed 0.07 from below 0° C. to above +80° C. The laminates could be formed into, for example, valve gear covers and timing gear covers for internal combustion engines, e.g. by deep drawing.

EXAMPLE 3

The composition of Example 1 was modified by replacing the chlorinated polyethylene by an equal weight of a copolymer of 80% by weight of vinylidene chloride and 20% by weight of ethyl acrylate and sheets were formed from the composition.

The loss factor of samples of the sheet was measured by the method described in Example 1 and was found to exceed 0.1 from below $-20°$ C. to above $+80°$ C.

Laminates containing interlayers of this composition between mild steel sheets had similar vibrational characteristics to those of Example 1.

Similar results may be obtained by replacing the vinylidene chloride/ethyl acrylate copolymer by an equal weight of a copolymer of 90% by weight of vinylidene chloride and 10% by weight of acrylonitrile, by replacing the styrene/butadiene copolymer by an equal weight of polystyrene, and by replacing up to 20% by weight of the styrene/butadiene copolymer by a cross-linked butadiene/styrene elastomer.

What I claim is:

1. A vibration damping composition comprising
   (i) from 10 to 60% by weight of a copolymer of 60 to 80% by weight of butadiene and 40 to 20% by weight of acrylontrile,
   (ii) from 10 to 50% by weight of a polymer selected from the group consisting of polystyrene and a copolymer of 10 to 35% by weight of butadiene and 90 to 65% by weight of styrene, and
   (iii) from 30 to 80% by weight of a chlorine-containing polymer selected from the group consisting of (a) chlorinated ethylene polymers containing 15 to 50% by weight of chlorine and (b) copolymers of 30 to 90% by weight of vinylidene chloride and 70 to 10% by weight of at least one alkyl ester or nitrile of acrylic or methacrylic acid, the percentages of (i), (ii) and (iii) in the composition being chosen to total 100, said composition having effective vibration damping properties in the range —10° C. to 100° C.

2. A composition as claimed in claim 1 containing from 30 to 50% by weight of the copolymer of butadiene and acrylonitrile.

3. A composition as claimed in claim 1 containing 15 to 25% by weight of the styrene polymer or copolymer.

4. A composition as claimed in claim 1 containing 35 to 60% by weight chlorine-containing polymer.

5. A composition as claimed in claim 1 in which the chlorine-containing polymer is a copolymer of vinylidene chloride with ethyl acrylate or acrylonitrile.

6. A composition as claimed in claim 1 in which up to 20% by weight of the styrene polymer or copolymer is replaced by a cross-linked butadiene/styrene copolymer elastomer.

7. A composition as claimed in claim 1 which also contains finely divided filler, said filler being present in an amount not exceeding 5% of the overall weight of composition and filler.

8. A composition as claimed in claim 1 which also contains a finely divided filler said filler being present in an amount of up to 60% of the sum of the weights of composition and filler.

9. A sheet or foil of a composition according to claim 1.

References Cited

UNITED STATES PATENTS

| | | | |
|---|---|---|---|
| 2,786,785 | 3/1957 | Wise | 117—139 |
| 3,496,251 | 2/1970 | Takahashi et al. | 260—876 |

FOREIGN PATENTS

| | | | |
|---|---|---|---|
| 987,823 | 3/1965 | Great Britain | 260—891 |

MURRAY TILLMAN, Primary Examiner

J. SEIBERT, Assistant Examiner

U.S. Cl. X.R.

260—41.5 R, 41.5 A, 891; 161—217